United States Patent [19]
Bley et al.

[11] Patent Number: 4,779,449
[45] Date of Patent: Oct. 25, 1988

[54] LEAK DETECTOR AND LEAK DETECTION METHOD

[75] Inventors: Werner G. Bley, Alfter; Günter Reich, Köln, both of Fed. Rep. of Germany

[73] Assignee: Leybold-Heraeus GmbH, Köln, Fed. Rep. of Germany

[21] Appl. No.: 108,797

[22] Filed: Oct. 15, 1987

[30] Foreign Application Priority Data

Mar. 27, 1987 [EP] European Pat. Off. .......... 87104546

[51] Int. Cl.$^4$ .................................. G01M 3/20
[52] U.S. Cl. .................................... 73/40.7
[58] Field of Search ............... 73/40.7; 250/288, 289

[56] References Cited

U.S. PATENT DOCUMENTS

| | | | |
|---|---|---|---|
| 3,520,176 | 7/1970 | Becker | 73/40.7 |
| 3,690,151 | 9/1972 | Briggs | 73/40.7 |
| 4,294,106 | 10/1981 | Gevaud et al. | 73/40.7 |
| 4,487,058 | 12/1984 | Mennenga | 73/40.7 |
| 4,735,084 | 4/1988 | Fuzzetti | 73/40.7 |

FOREIGN PATENT DOCUMENTS

| | | | |
|---|---|---|---|
| 2049117 | 6/1971 | Fed. Rep. of Germany . | |
| 35434 | 3/1983 | Japan | 73/40.7 |

Primary Examiner—Tom Noland
Assistant Examiner—Hezron E. Williams
Attorney, Agent, or Firm—Spencer & Frank

[57] ABSTRACT

Leak detector operating according to the countercurrent principle is used in a leak detection method and includes a first high vacuum pump having an inlet which is connected to an inlet of the leak detector, a second high vacuum pump having an inlet which is connected to a mass spectrometer, and a first roughing pump having an inlet which is connected to the outlets of the first and second high vacuum pump respectively. In order, on the one hand, to detect particularly large leaks and, on the other hand, avoid overloads due to high test gas concentrations, a second roughing pump is provided having an inlet which may be selectably connected to one of the inlet of the leak detector via a conduit equipped with a control valve and to the inlet of the first roughing pump by way of a conduit equipped with a choke.

14 Claims, 1 Drawing Sheet

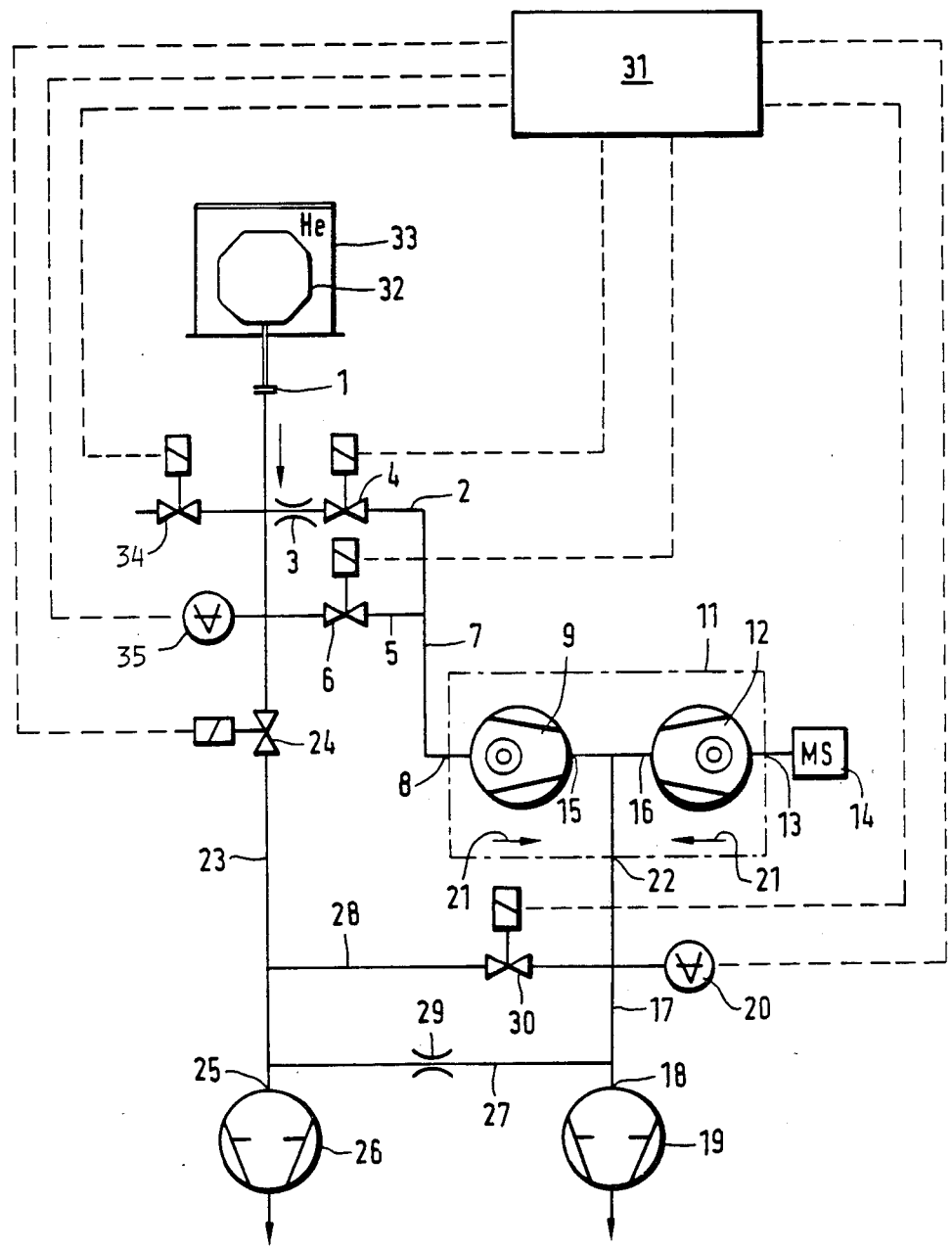

LEAK DETECTOR AND LEAK DETECTION METHOD

BACKGROUND OF THE INVENTION

1. Field of the Invention

The present invention relates to a leak detector apparatus operating according to the countercurrent principle and including a first high vacuum pump whose inlet is connected to an inlet of the leak detector, a second high vacuum pump whose inlet is connected to a test gas detector, e.g., a mass spectrometer, and a roughing pump whose inlet is connected to the outlets of the high vacuum pumps, and to a leak detection method employing the leak detector apparatus.

2. Description of the Related Art

A leak detector of this type is disclosed in Federal Republic of Germany Pat. No. 2,049,117. A vessel or object to be tested is disposed within a test chamber filled with a test gas of helium or a mixture of helium and air. If the test object leaks, test gas flows in the conveying direction through the leak into the interior of the test object, down through the first high vacuum pump and then, because of the relatively low compression capability for light gases, in the opposite direction through the second high vacuum pump to a mass spectrometer's analyzer tube.

Should a leak detector of this type be subjected to a vessel being tested which has a particularly large leak, there exists the danger that a relatively large amount of test gas can enter the leak detector device. This results not only in temporary overloads, but also in long-term contamination of leak detector apparatus elements, such as the mass spectrometer, where complete removal of the helium constituent of the test gas requires relatively long pumping periods. Moreover, the remaining apparatus elements, particularly the roughing pump, are contaminated with helium for a relatively long period of time so that leak measurements made shortly after an overload are fraught with large errors.

If, as is frequently the custom, the test object is preliminarily evacuated through a separate conduit by means of a roughing pump until it can be connected with the high vacuum pump, then there exists the danger, if there is a particularly large leak in the test object, that most or perhaps even all of the helium present in the test chamber leaks into the test object and is pumped out during the preliminary evacuation. When the test object is subsequently connected to the high vacuum pump and, thus, the actual leak detection begins, very little or no test gas can be detected. The result is that the test object is considered to be leaking only slightly or not at all, although in actuality it leaks considerably.

SUMMARY OF THE INVENTION

It is the object of the present invention to develop a leak detection method and leak detector apparatus of the above-mentioned type in which overloads of the mass spectrometer test gas detector are prevented, the detection of even particularly large leaks is ensured, and it is possible to perform the leak detection automatically over a very large sensitivity range.

These and other objects are accomplished according to the present invention by providing the aforementioned leak detector apparatus with a second roughing pump whose inlet may be selectively connected to one of the inlet of the leak detector by way of a conduit equipped with an adjustable control valve and the inlet of the first roughing pump by way of a conduit equipped with a choke.

That is, in a leak detector operating according to the countercurrent principle, having an inlet port, and comprised of a first high vacuum pump having an inlet and an outlet; a second high vacuum pump having an inlet and an outlet; a first roughing pump having an inlet; and a test gas detector which is a mass spectrometer; wherein a conduit connects the inlet of the first high vacuum pump to the inlet of the leak detector, the inlet of the second high vacuum pump is connected to the mass spectrometer, and a roughening conduit connects the inlet of the first roughing pump to the outlet of the first high vacuum pump and to the outlet of the second high vacuum pump, the improvement according to the invention comprises: a second roughing pump having an inlet, which inlet is selectively connectable to one or both of the inlet of the leak detector and the inlet of the first roughing pump, wherein a conduit having a control valve connects the inlet of the second roughing pump to the inlet of the leak detector, and wherein a conduit having a choke connects the inlet port of the second roughing pump and the inlet of the first roughing pump.

In a leak detector of this configuration, it is possible to begin leak detection already when evacuation of the test object begins. For this purpose, the test object is evacuated by means of the second roughing pump. If a particularly large leak exists, test gas is already extracted during this phase. A small portion of the test gas reaches the outlet of the second high vacuum pump by way of a conduit including a choke which connects the inlets of the two roughing pumps, and from there it flows, in the opposite direction, to the mass spectrometer. Even a massively large leak in the test object can thus be detected. Further, the choke is selected to be sufficiently small so that the danger of an overload or contamination of the mass spectrometer does not exist.

If, during the aforementioned evacuation phase of the test object no test gas has been detected, the inlet of the first high vacuum pump can be connected directly to the test object once a defined pressure has been realized in the test object, and a more sensitive leak detection phase begun. This step easily can be made to occur automatically as a function of the pressure of the test object.

BRIEF DESCRIPTION OF THE DRAWING

Further objects and advantages of the present invention, the structure and operation of the leak detector, and the leak detection method will become apparent to those skilled in the art of leak detection from the following detailed description taken in conjunction with the drawing which is a schematic representation of a leak detector.

DESCRIPTION OF THE PREFERRED EMBODIMENTS

The drawing figure is a schematic representation of a leak detector whose inlet is marked 1. Inlet 1 is connected, via parallel conduits 2 (equipped with choke 3 and control valve 4) and 5 (equipped with control valve 6) and via conduit 7, with inlet 8 of a first high vacuum pump 9.

The high vacuum pump 9 is one pumping stage of a twostage turbomolecular pump 11 whose second high vacuum pump is marked 12. Inlet 13 of the second high vacuum pump 12 is connected to a test gas detector, preferably a mass spectrometer 14. Outlets 15, 16 of high vacuum pumps 9, 12, respectively, are jointly connected, via a roughing conduit 17, to inlet 18 of a first roughing pump 19. Roughing conduit 17 is also connected to a pressure measuring device 20.

The two high vacuum pumps 9, 12 of the turbomolecular pump 11 have respective rotors disposed on a common shaft. Inlets 8, 13 are positioned opposite one another and disposed in respective opposing regions of the outer frontal faces of turbomolecular pump 11. During operation, the flow through the two high vacuum pump 9, 12 occurs from the exterior toward the interior (arrows 21) so that only one roughing port, common roughing port 22, is provided and is connected to roughing conduit 17.

Inlet 1 of the leak detector is additionally connected via conduit 23 to control valve 24 and to inlet 25 of a second roughing pump 26. A ventilation valve 34 and pressure measuring device 35 are also connected to conduit 23 between inlet 1 and control valve 24.

Inlets 18, 25 of the two roughing pumps 19, 26 are connected together by means of two parallel conduits 27 and 28. Conduit 27 includes a choke 29. Conduit 28 is equipped with a control valve 30.

To automate the leak detection sequence, a computer automated central control 31 is provided which is connected, inter alia, by way of control conduits (not individually identified with reference numerals), to control valves 4, 6, 24 and 30, respectively, and to pressure measuring devices 20, 35.

The procedure for performing a leak detection with the illustrated leak detector is as follows:

Initially, with control valves 4, 6, 24 and 30 closed, the leak detector is put into its operational state by turning on turbomolecular pump 11 and roughing pumps 19, 26. The apparatus is ready for operation when the pressure in mass spectrometer 14 is less than $10^{-4}$ mbar or, more precisely, when turbomolecular pump 11 has reached its desired rpm and when the roughing pressure, as measured by pressure measuring device 20, is less than the maximum permissible pressure (e.g. 0.1 mbar).

Test object 32 to be examined is, for example, a vessel or container, and is disposed in test chamber 33 and connected to inlet 1 of the leak detector. Test gas, preferably helium, is disposed in test chamber 33. During the leak detection process, this test gas enters into test object 32 if the latter has a leak. Test chamber 33 can be omitted if exterior of the test object 32, as is often the case, is sprayed with gaseous helium.

To initiate the leak detection process, the possibly still open ventilation valve 34 is closed and control valve 24 in conduit 23 is opened. This establishes a connection between test object 32 and second roughing pump 26 and causes the test object 32 to be evacuated.

If test object 32 has a particularly large leak (e.g. producing a leakage rate ranging from about 1000 to 0.1 mbar l/s), helium is extracted already during this first evacuation phase. This helium travels countercurrently through choke 29 in conduit 27, through roughing conduit 17, and through the second high vacuum pump 12 to mass spectrometer 14 and is there recorded. In this case, the leak detection process is terminated after this first leak detection phase and control valve 24 is closed. Test object 32 is ventilated so that it can be from inlet 1 and replaced by a new test object.

If test object 32 does not have a large leak, the pressure in the interior of test object 32, recorded by pressure measuring device 35 will drop relatively quickly. Once it reaches a value of about 100 mbar, control valve 4 is opened so that first high vacuum pump 9 is connected via choke 3, to conduit 23 and inlet 1, and thus with test object 32. If, during further evacuation down to a pressure of 0.1 mbar, helium enters into test object 32, this helium travels through choke 3 and through the two high vacuum pumps 9, 12 to mass spectrometer 14. The leak detection process can be terminated at this point. Leaks involving leakage rates having an order of magnitude of about 10 to $10^{-5}$ mbar l/s can be detected during this second leak detection phase.

If during the second leak detection phase mass spectrometer 14 does not record any helium, a third leak detection phase with even greater sensitivity is begun by connecting test object 32 to first high vacuum pump 9 without any choking. For this purpose, control valve 24 is closed when a pressure of about 0.1 mbar is reached in test object 32 and control valve 30 is opened. The test object 32 is then evacuated through first high vacuum pump 9 and the two roughing pumps 19, 26. Any helium conveyed therethrough travels through the second high vacuum pump 12 of turbomolecular pump 11 to mass spectrometer 14. Leaks involving leakage rates from about $10^{-3}$ to $10^{-9}$ mbar l/s can be detected during this leak detection phase.

If the test object continuous to be leak tight, its internal pressure will drop further. Once the pressure has dropped to about $2.10^{-2}$ mbar as determined by pressure measuring device 20, a fourth and even more sensitive leak detection phase is begun by closing control valve 30. The pumping speed of the roughing pump system thus decreases considerably so that the leak detection becomes correspondingly more sensitive. If mass spectrometer 14 records no helium even in this fourth phase, test object 32 can be considered to be gas tight.

The pumping speed of second roughing pump 26, e.g., 25 or 26 m³/h, is advisably higher by a factor of 5 to 10 than the pumping speed of first roughing pump 19, e.g., 4 m³/h. This results in the advantage that evacuation of test object 32 occurs relatively quickly during the first leak detection phases. If, during the fourth leak detection phasle, only the relatively small first roughing pump 19 is active, the sensitivity of the leak detection process is so high that even leaks down to $10^{-10}$ mbar l/s can be detected.

The size of choke 29 is selected in such a manner that, with a pressure difference of about 1000 mbar, choke 29 constitutes a leak at a leakage rate of about 0.1 mbar l/s. For the first phase of the leak detection process in which particularly large leaks are detected, the size is sufficient. When the pressure differences become smaller, the gas flow rate through choke 29 decreases very rapidly so that it can be neglected during the other leak derection phases.

Choke 3 is adjusted in such a manner that the roughing pressure, as measured by pressure measuring device 20, is less than or equal to 0.1 mbar at an inlet pressure, as measured by pressure measuring device 35, which is less than or equal to 100 mbar. A roughing pump having a pumping speed of 4 m³/h (i.e. approximately equal to 1 l/s), produces a gas stream of 0.1 mbar l/s. Parallel conduits 27, 28, choke 29 and control valve 30 may be replaced by a single conduit having a regulatable choke valve.

The drawing figure and the specification consider only the case in which a test object 32 disposed in test chamber 33 is connected to inlet 1 of the leak detector. It is, of course, also possible that test object 32 itself be filled with helium rather than filling test chamber 33. In this case, the interior of test chamber 33 must be connected with inlet 1 of the leak detector. Finally, a hose-type probe may also be connected to inlet 1 and is then used to examine the helium-filled test object 32.

To connect inlet 1 of the leak detector with first high vacuum pump 9, sequentially in a choked and then in an unchoked manner, two mutually parallel conduits 2, 5 including valves 4, 6 and choke 3 are shown. It is also possible to replace these apparatus elements by a single regulatable choke valve which can be regulated between the smallest desired gas rate and an unchoked open position.

The present disclosure relates to the subject matter disclosed in European Patent Application, No. 87 104 546.4, filed Mar. 27th, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a leak detector operating according to the countercurrent principle, having an inlet, and comprised of:
   a first high vacuum pump having an inlet and an outlet;
   a second high vacuum pump having an inlet and an outlet;
   a first roughing pump having an inlet; and
   a test gas detector which is a mass spectrometer;
   wherein a conduit connects the inlet of the first high vacuum pump to the inlet of the leak detector, the inlet of the second high vacuum pump is connected to the mass spectrometer, and a roughening conduit connects the inlet of the first roughing pump to the outlet of the first high vacuum pump and to the outlet of the second high vacuum pump, the improvement comprising:
   a second roughing pump having an inlet, which inlet is selectively connectable to one or both of the inlet of the leak detector and the inlet of the first roughing pump, wherein a conduit having a control valve connects the inlet of the second roughing pump to the inlet of the leak detector, and a conduit having a choke connects the inlet of the second roughing pump and the inlet of the first roughing pump.

2. The leak detector according to claim 1, wherein the conduit which connects the inlet of the first high vacuum pump to the inlet of the leak detector comprises a control valve and a choke arranged in series.

3. The leak detector according to claim 2, wherein a conduit comprising a control valve is provided parallel to the conduit which connects the inlet of the first high vacuum pump to the inlet of the leak detector.

4. The leak detector according to claim 1, wherein the conduit which connects the inlet of the first high vacuum pump to the inlet of the leak detector comprises a regulatable choke valve.

5. The leak detector according to claim 1, wherein a conduit comprising a control valve is provided parallel to the conduit which connects the inlet of the second roughing pump and the inlet of the first rough pump.

6. The leak detector according to claim 1, wherein the choke of the conduit which connects the inlet of the second roughing pump and the inlet of the first roughing pump is a regulatable choke valve.

7. The leak detector according to claim 1, wherein the first and second roughing pumps have respective pumping speeds, and wherein the pumping speed of the second roughing pump is greater than the pumping speed of the first roughing pump.

8. The leak detector according to claim 1, wherein the choke of the conduit which connects the inlet of the second roughing pump to the inlet of the first roughing pump has a leakage rate of about 0.1 m-bar l/s at a pressure difference of about 1000 bar.

9. The leak detector according to claim 1, wherein the first and second high vacuum pumps together comprise a turbomolecular pump and have respective rotors disposed on a common shaft, wherein the turbomolecular pump has outer frontal faces, the inlet of the leak detector and the mass spectrometer being positioned opposite one another and in respective opposing regions of the outer frontal faces so that during operation, the flow through the first and second high vacuum pumps is directed from the exterior to the interior of the turbomolecular pump, and wherein a common roughing port is provided between the first and second high vacuum pumps.

10. A leak detection method, comprising:
   a. providing a leak detector operating according to the countercurrent principle, having an inlet, and comprised of:
   a first high vacuum pump having an inlet and an outlet;
   a second high vacuum pump having an inlet and an outlet;
   a first roughing pump having an inlet;
   a second roughing pump having an inlet, which inlet is selectively connectable to one or both of the inlet of the leak detector and the inlet of the first roughing pump; and
   a test gas detector which is a mass spectrometer,
   wherein a conduit connects the inlet of the first high vacuum pump to the inlet of the leak detector, the inlet of the second high vacuum pump is connected to the mass spectrometer, a conduit connects the inlet of the first roughing pump to the outlet of the second high vacuum pump, a conduit having a control valve connects the inlet of the second roughing pump to the inlet of the leak detector, and a conduit having a choke connects the inlet of the second roughing pump to the inlet of the first roughing pump;
   b. connecting a test object to be tested for leaks to the inlet of the leak detector; and
   c. selectively connecting the inlet of the second roughing pump to the inlet of the leak detector.

11. The leak detection method according to claim 10, wherein the conduit connecting the inlet of the first high vacuum pump to the inlet of the leak detector has a control valve and a choke arranged in series, and wherein after steps b and c, and after reducing the pressure in the test object to about 100 mbar, the method comprises the further step of
   connecting the inlet of the first high vacuum pump to the inlet of the leak detector via the conduit having a control valve and a choke.

12. The leak detection method according to claim 11, wherein a conduit comprising a control valve is provided parallel to the conduit which connects the inlet of the first high vacuum pump to the inlet of the leak detector and wherein after further reducing the pressure in the test object to about 0.1 mbar, the method comprises the further step of closing the control valve of the conduit connecting the inlet of the first high vacuum pump to the inlet of the leak detector having a control valve and a choke so that evacuation continues without choking.

13. The leak detection method according to claim 10, wherein the conduit connecting the inlet of the first high vacuum pump to the inlet of the leak detector has a control valve and a choke arranged in series, wherein a conduit having a control valve is provided parallel to the conduit having a choke which connects the inlet of the second roughing pump to the inlet of the first roughing pump, and wherein after further reducing the pressure in the test object to about 0.1 mbar, the method comprises the further steps of closing the control valve of the conduit which has a control valve and a choke in series and connects the inlet of the first high vacuum pump to the inlet of the leak detector; and closing the control valve of the conduit which connects the inlet of the leak detector to the inlet of the second roughing pump so that evacuation continues without choking.

14. The leak detection method according to claim 13, wherein after further reducing the pressure in the test object to $10^{-2}$ mbar, the method comprises the further step of closing the control valve in the conduit which is parallel to the conduit having a choke which connects the inlet of the second roughing pump and the inlet of the first roughing pump.

* * * * *

UNITED STATES PATENT AND TRADEMARK OFFICE
CERTIFICATE OF CORRECTION

PATENT NO. : 4,779,449

DATED : October 25, 1988

INVENTOR(S) : Werner Grosse Bley et al.

It is certified that error appears in the above-identified patent and that said Letters Patent is hereby corrected as shown below:

In the heading of the patent under [75] change "Werner G. Bley" to --Werner Grosse Bley--.

Signed and Sealed this

Seventh Day of March, 1989

Attest:

DONALD J. QUIGG

Attesting Officer     Commissioner of Patents and Trademarks